United States Patent [19]

Suzuki et al.

[11] Patent Number: 5,166,376
[45] Date of Patent: Nov. 24, 1992

[54] PROCESS FOR REFINING VEGETABLE OIL

[75] Inventors: Shigemi Suzuki; Nobuyuki Maebashi; Shigeru Yamano; Hiashi Nogaki, all of Chigasaki; Akio Tamaki; Akiteru Noguchi, both of Kawasaki, all of Japan

[73] Assignees: Mitsubishi Kakoki Kaisha Ltd., Tokyo; Toto Ltd., Kitakyushu, both of Japan

[21] Appl. No.: 765,969

[22] Filed: Sep. 26, 1991

[30] Foreign Application Priority Data

Sep. 26, 1990 [JP] Japan .................................. 2-254137

[51] Int. Cl.$^5$ .............................................. C07C 1/00
[52] U.S. Cl. ......................................... 554/10; 554/12; 554/175; 554/212
[58] Field of Search ................ 260/428; 554/212, 175, 554/10, 12

[56] References Cited

U.S. PATENT DOCUMENTS 4,062,882 12/1977 Gupta .............................. 260/428.5

FOREIGN PATENT DOCUMENTS 1509543 5/1978 United Kingdom .

OTHER PUBLICATIONS

Chemical Abstracts, vol. 106, #6, p. 179, 1987, 35918q.

Primary Examiner—Jose G. Dees
Assistant Examiner—Deborah D. Carr
Attorney, Agent, or Firm—Oblon, Spivak, McClelland, Maier & Neustadt

[57] ABSTRACT

A process for refining vegetable oil from a miscella obtained by extraction of vegetable seeds with an organic solvent, which comprises permeating the miscella through an ultrafilter made of an inorganic microporous membrane having a pore size of from 30 to 100 Å in a state heated at a temperature of from 50° to 120° C. to remove impurities contained in the miscella.

14 Claims, 3 Drawing Sheets

PROCESS FOR REFINING VEGETABLE OIL

BACKGROUND OF THE INVENTION

1. Field of the Invention

The present invention relates to a process for refining vegetable oil by subjecting a miscella obtained by extraction of vegetable seeds with an organic solvent to ultrafiltration.

2. Discussion of Background

Conventional vegetable oils used as edible oils include soybean oil, rapeseed oil, safflower oil, corn oil, sunflower oil and rice bran oil. To obtain such vegetable oils, it is common to extract a raw material with an organic solvent such as n-hexane to obtain a miscella and to remove the organic solvent from this miscella to obtain a crude glyceride oil. This crude glyceride oil usually contains from 0.5 to 3% by weight of waxes such as higher alcohols and impurities such as peptides, organic sulfur compounds, carbohydrates, fatty acids, hydrocarbons, sterol, lower ketones, lower aldehydes and coloring matters, in addition to phospholipids such as lecithin.

It is necessary to remove such impurities from the crude glyceride oil, since such impurities tend to decompose or polymerize, whereby oils tend to be colored and bad odors are likely to be generated. As a conventional process for removing impurities from a crude glyceride oil, there is, for example, a process as shown in FIG. 3, wherein firstly, in a process of removing gums, water is added to the crude glyceride oil to hydrate the gum substance composed mainly of phospholipids (hydration), followed by centrifugal separation to remove the gum substance. Even by this hydration, phospholipids can not completely be removed. Therefore, at the beginning of the subsequent process of removing acids, phospholic acid (or citric acid) is introduced to further form a gum substance, and then an alkali such as caustic soda is added for saponification of fatty acids, so that the gum substance and fatty acids form a slime, and the slime is then removed by a centrifugal separator. Further, water is added for the purpose of e.g. removal of the added reagents to form a slime, and this slime is removed by a centrifugal separator. Then, in a bleaching and deodorizing step, coloring matters and impurities which could not be removed by the above alkali refining, such as heavy metals, fatty acids, soap materials, and gum substance, are removed by adsorption and vacuum distillation to obtain purified vegetable oil. As described in the foregoing, in the conventional process for removing the gum substance, slime, etc. from the crude glyceride oil, the purification process is complicated, the utility costs such as costs for chemical reagents are substantial, and the vegetable oil is lost when the gum substance, etc. are discharged from the centrifugal separator.

In a process proposed to solve such problems, Japanese Unexamined Patent Publication No. 153010/1975 proposes to use an ultrafiltration membrane made of polysulfone, polyaclylonitrile or polyamide and Japanese Unexamined Patent Publication No. 19499/1983 proposes to use a polyimide-type ultrafiltration membrane, and the proposed process comprises diluting a crude glyceride oil with an organic solvent such as n-hexane, contacting the diluted oil with the ultrafiltration membrane under pressure, and removing the organic solvent from the permeate to obtain purified vegetable oil.

However, in the process wherein the above-mentioned ultrafiltration membrane is employed, a non-aqueous organic solvent is contacted with an organic compoundbased filtration membrane, whereby the operation temperature is rather limited, and it is required to cool the miscella obtained from the extraction process. Further, when used for a long period of time, the membrane tends to undergo swelling by the influence of the organic solvent in the miscella, whereby there will be a problem such that the degree of selectivity of cut off limit tends to deteriorate.

SUMMARY OF THE INVENTION

The present invention has been made in view of such problems in the conventional process, and it is an object of the present invention to provide a process for obtaining vegetable oil of high purity free from inclusion of impurities such as phospholipids, by means of a filtration membrane excellent in the heat resistance and solvent resistance, capable of providing a high flux rate and free from swelling even when used for a long period of time.

Thus, the present invention provides a process for refining vegetable oil from a miscella obtained by extraction of vegetable seeds with an organic solvent, which comprises permeating the miscella through an ultrafilter made of an inorganic microporous membrane having a pore size of from 30 to 100 Å in a state heated at a temperature of from 50° to 120° C. to remove impurities contained in the miscella.

DETAILED DESCRIPTION OF THE PREFERRED EMBODIMENTS

Figure 1:
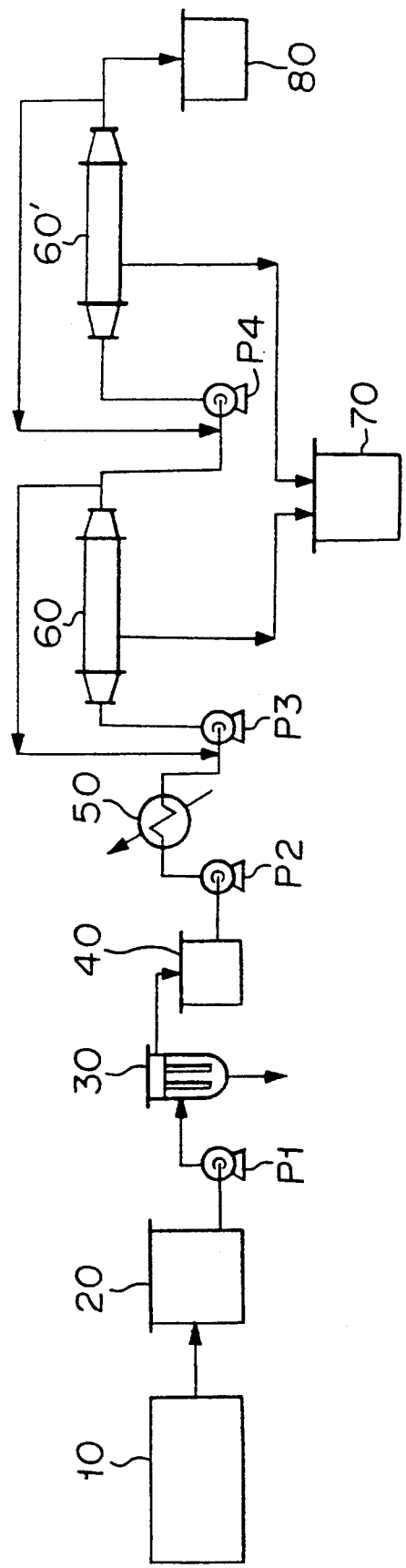
FIG. 1 is a process flow diagram illustrating the process for refining vegetable oil of the present invention.

The miscella to be used in the present invention is the one obtained by extracting vegetable seeds with an organic solvent.

As such vegetable seeds, soybean, rapeseed, safflower, corn, sunflower or rice bran may be used, as mentioned above. However, the vegetable seeds are not limited to such specific examples.

The organic solvent useful for extracting the vegetable seeds, includes, for example, an aliphatic hydrocarbon such as pentane, n-hexane or octane, an alicyclic hydrocarbon such as cyclopropane, cyclopentane, cyclohexane or cycloheptane, an aromatic hydrocarbon such as benzene, toluene or xylene, an aliphatic ketone such as acetone or methyl ethyl ketone, and an aliphatic ester such as ethyl acetate or butyl acetate. Preferred is n-hexane.

The miscella obtained by extraction of vegetable seeds with an organic solvent, usually contains glycerides in an amount of from 25 to 35% by weight. However, the content of glycerides is not limited to such a concentration range.

It has been found that when the miscella is subjected to filtration by the ultrafilter of the present invention without separating it into the organic solvent and glycerides by a distillation operation as was the case in the conventional processes, the flux rate is high, and the merit supersedes the demerit of an increase in the amount of liquid by the solvent.

In the present invention, the temperature of the miscella treated by the ultrafilter is set usually at a level of from 50° to 120° C., preferably from 50° to 90° C., which is relatively high as compared with a case where a conventional nonaqueous organic ultrafiltration membrane is employed.

As will be described hereinafter, the ultrafilter to be used in the present invention is made of an inorganic material such as zircon (zirconium oxide), and its heat resistance is not limited as distinguished from the conventional nonaqueous organic filter. The viscosity of oils tends to decrease logarithmically with an increase of the temperature, whereby the flux rate through the filter increases with an increase of the temperature of the miscella.

Accordingly, in the present invention, the temperature of the miscella to be treated is set at a level of from 50° to 120° C. If the temperature is lower than 50° C., the flux rate tends to be low, such being undesirable. On the other hand, if it exceeds 120° C., recovered phospholipids in the retentate tend to undergo property changes, such being undesirable.

The present invention is characterized in that the miscella thus adjusted to a prescribed temperature, is treated by means of a ultrafilter made of an inorganic microporous membrane having a pore size of from 30 to 100 Å.

Here, the ultrafilter to be used in the present invention, may be prepared by a suitable method such as extrusion forming or press forming using an inorganic material such as glass or ceramics such as zirconium oxide ($ZnO_2$), tin oxide ($SnO_2$), titanium oxide ($TiO_2$) or cesium oxide ($CeO_2$), to form an inorganic microporous membrane having a pore size of from 30 to 100 Å.

If the pore size is less than 30 Å, the flux rate of the miscella tends to be low. On the other hand, if it exceeds 100 Å, the degree of selectivity for the separation of gum substance tends to be low, such being undesirable.

The shape of the ultrafiltration membrane is optional, and it may be, for example, tubular or monolithic.

The structure of the inorganic microporous membrane is not limited to a single layer structure. It may have a composite structure having an inorganic microporous membrane formed on a porous substrate having a pore size larger than the pore size of the inorganic microporous membrane, so long as it has at least one layer of inorganic microporous membrane having a pore size of from 30 to 100 Å.

The inorganic microporous membrane is preferably as thin as possible in order to improve the flux rate. For this purpose, the composite structure is suitable. In such a case, the thickness of the inorganic microporous membrane is preferably from 0.2 to 10 μm, and the inorganic microporous membrane preferably has the smallest pore size among a plurality of layers and constitutes the outermost layer for contact with the miscella Such a composite membrane can readily be formed, for example, by coating a slurry sol of the above inorganic material in a desired thickness on a porous substrate made of e.g. inorganic material, followed by dehydration for gellation, drying and calcination.

Phospholipids contained in the miscella have a molecular weight approximately equal to the molecular weight of triglyceride, but they are mutually associated to form polymers. Therefore, when such miscella is treated by the ultrafilter of the present invention, impurities such as phospholipids contained in the miscella will not pass through the ultrafilter, whereas the organic solvent solution containing glycerides will permeate through the filter as a permeate fraction.

The pressure during the ultrafiltration varies depending upon the shape of the ultrafilter, but usually within a range of from 1 to 10 kg/cm$^2$, preferably from 2 to 5 kg/cm$^2$.

Further, when the miscella is subjected to ultrafiltration under the above described conditions, it is preferred to circulate the miscella in a cross flow fashion against the ultrafilter. In such a case, the liquid speed of the miscella against the membrane surface of ultrafilter is usually from 0.5 to 6 m/sec, preferably from 2 to 5 m/sec.

Further, the organic solvent solution containing glycerides having the gum substance such as phospholipids removed therefrom, will then be subjected to e.g. distillation to remove the organic solvent, followed by bleaching and deodorizing in accordance with the conventional methods. Now, the present invention will be described in further detail with reference to the drawings.

FIG. 1 is a process flow diagram for recovering vegetable oil according to the present invention. In FIG. 1, a miscella obtained in a usual continuous extraction step 10 is once stored in a miscella tank 20. Then, the miscella is sent via a pump P1 to a solid material removal filter 30 which is a notch wire filter or a usual microfiltration filter made of a sintered alloy, whereby solid material contained in the miscella is removed, and then the miscella is supplied to a service tank 40. The miscella in the service tank 40 is pressurized to a level of from 2 to 5 kg/cm$^2$ by a pressure up pump P2 and then preheated to a temperature of about 70° C. by a preheater 50, and then it is supplied to an ultrafilter 60 of the present invention of the first stage.

Here, in order to attain a linear velocity on the surface of the ultrafiltration membrane, it is preferred to circulate the retentate by means of a circulation line.

The permeate fraction having impurities such as phospholipids and waxes thus removed, will be stored in a recovered miscella tank 70.

On the other hand, the retentate discharged from the first stage ultrafilter 60, having phospholipids and waxes concentrated, is pressurized to some extent by a pump P4 and then supplied to a second stage ultrafilter 60'.

Also in the second stage ultrafilter, it is preferred to circulate the retentate by means of a circulation line in order to attain a linear velocity on the membrane surface.

The permeate of miscella having impurities such as phospholipids removed by the second ultrafilter 60' will be stored in the recovered miscella tank 70 in the same manner as the permeate fraction of the first stage. The recovered miscella collected in the recovered miscella tank 70 is then supplied to a solvent recovery unit (not shown) whereby the glyceride (oil) fraction is separated from the organic solvent by a distillation operation, and then bleached and deodorized by conventional methods to obtain purified vegetable oil.

On the other hand, the retentate having impurities such as phospholipids further concentrated by the second stage ultrafilter 60' will be stored in a slime tank 80 and then supplied to a recovery unit (not shown) for recovering a useful component such as lecithin.

The process flow diagram of FIG. 1 illustrates a case wherein two stages of ultrafilters are provided. However, depending upon the concentration of the miscella and the degree of removal of phospholipids, the number of stages of the ultrafilters may, of course, be increased.

Now, the present invention will be described in further detail with reference to Examples. However, it should be understood that the present invention is by no means restricted by such specific Examples.

EXAMPLE 1

Using the ultrafilter of the present invention and the process as shown in FIG. 1, a soybean miscella was purified.

Figure 2:
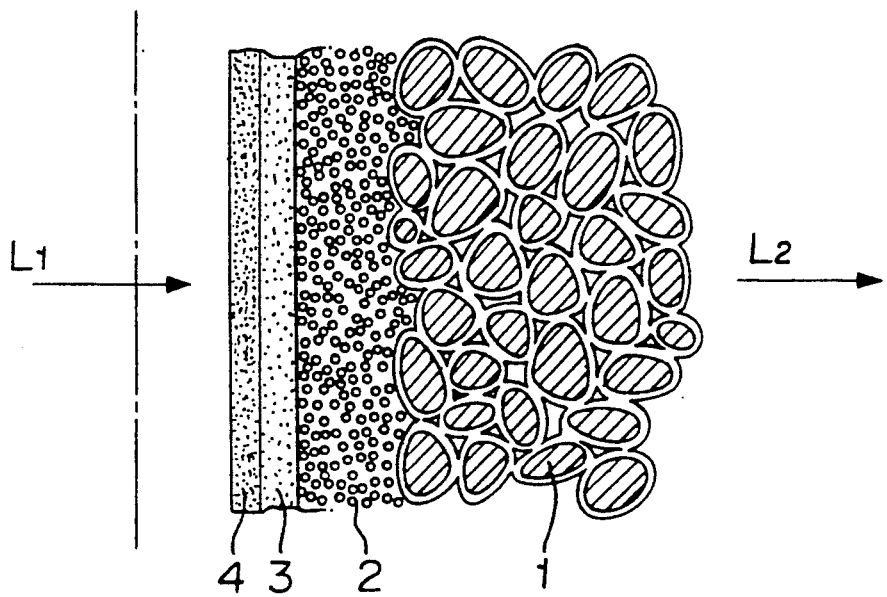
FIG. 2 is a diagrammatical enlarged cross sectional view of a ultrafiltration membrane used in the present invention.
Figure 3:
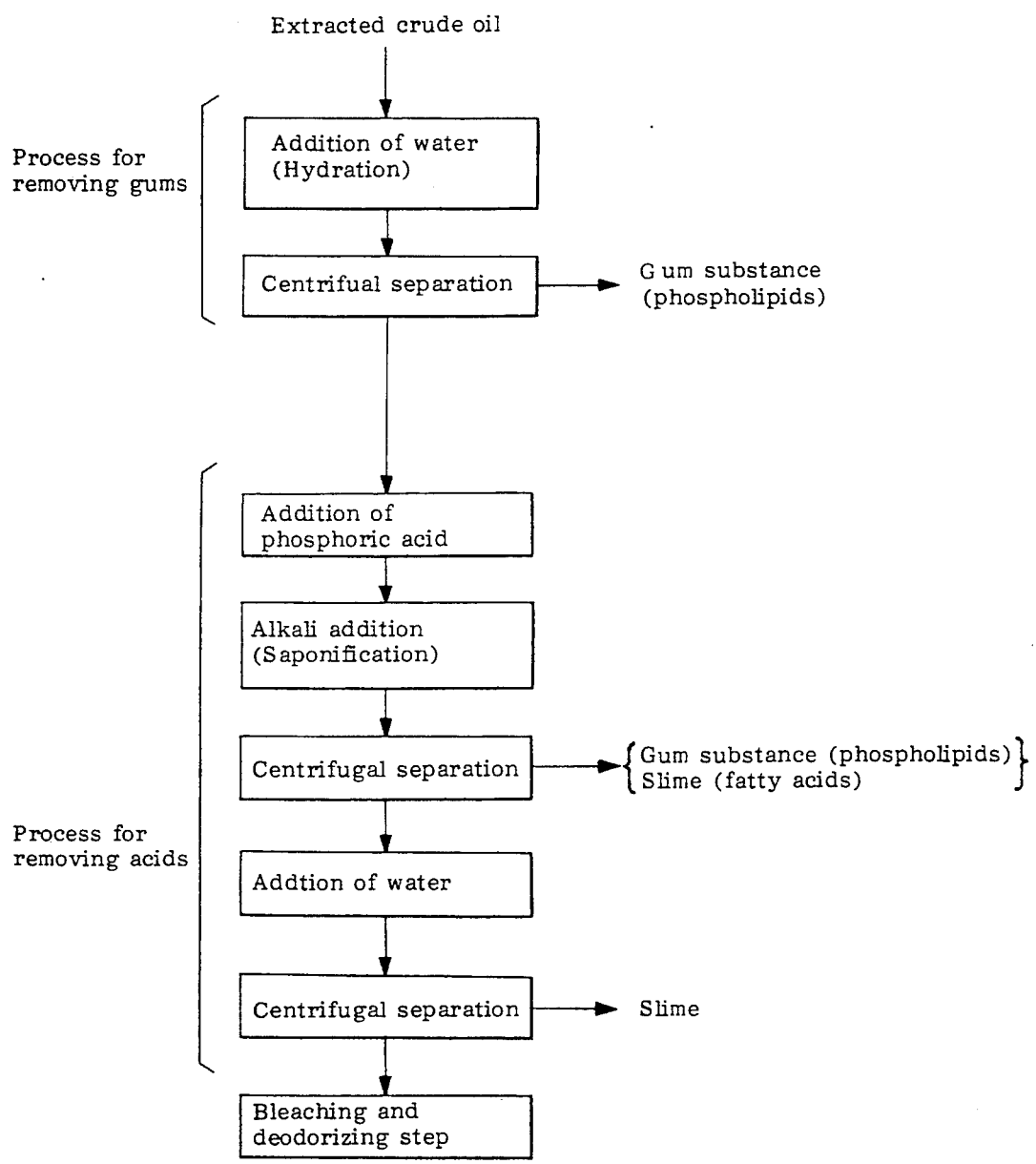
FIG. 3 is a flow chart for a conventional process for purifying a crude glyceride oil.

As the ultrafilter, an asymmetric membrane having a composite structure as shown in FIG. 2 was used.

In FIG. 2, reference numeral 1 indicates a porous alumina ($Al_2O_3$) substrate having a thickness of 0.5 mm and a pore size of from 3 to 13 $\mu$m. On one side of this substrate 1, an intermediate layer 2 having a thickness of from 30 to 60 $\mu$m and a pore size of from 0.5 to 1.0 $\mu$m was formed. On one side of this intermediate layer 2, an active layer 3 having a thickness of from 10 to 30 $\mu$m and a pore size of from 0.05 to 0.15 $\mu$m was formed. Further on one side of this active layer 3, a zirconia ($ZnO_2$) microporous membrane 4 having a thickness of from 0.2 to 10 $\mu$m and a pore size of 50 Å was formed.

On the other hand, as the first stage and second stage ultrafilters, ultrafilters comprising a porous alumina substrate having a diameter of 30 mm and a length of 50 cm and provided with seven holes each having an inner diameter of 4 mm and a length of 50 cm extending in the longitudinal direction of the substrate and a zirconia microporous membrane having a pore size of 50 Å formed by coating zirconia on the inner surface of each hole and sintering it, were employed. Using such ultrafilters, a soybean miscella (glyceride component=25-30% by weight, phospholipids=1-2% by weight) obtained by extracting soybean with n-hexane was heated to 65° C. by a preheater and treated by the first stage and second stage ultrafilters by adjusting the linear velocity of the respective filters to 2.0 m/sec and the pressure on the raw solution side to 3 kg/cm$^2$, whereby the flux rate of the permeate was 130 l/m$^2$·H, the glyceride concentration in the permeate was from 20 to 25% by weight, the concentration of phospholipids was from 20 to 30 ppm, impurities such as phospholipids in the permeate were extremely small, and the treating capacity was large.

COMPARATIVE EXAMPLE 1

Using the same apparatus as used in Example 1, the treating temperature was lowered to 40° C., the glyceride concentration in the permeate was from about 20 to 25% by weight and the concentration of phospholipids was from 20 to 30 ppm, which were satisfactory, but the flux rate of the permeate dropped to 90 l/m$^2$·H and the treating capacity decreased substantially.

COMPARATIVE EXAMPLE 2

A soybean miscella was treated in the same manner as in Example 1 except that an ultrafilter made of a nonaqueous organic membrane was used instead of the ultrafilter made of the zirconia microporous membrane.

However, since the used ultrafilter is made of a nonaqueous organic membrane, the treatment was conducted at 40° C. i.e. at an acceptable temperature for operation for a long period of time.

As a result, the glyceride concentration in the permeate was from about 20 to 25% by weight, the concentration of phospholipids was from 20 to 30 ppm, and the flux rate of the permeate decreased to 72 l/m$^2$·H.

As described in the foregoing, the present invention provides a process for refining vegetable oil, whereby vegetable oil of high quality is obtainable with minimum inclusion of impurities such as phospholipids, and it is possible to reduce the cost of installation, since the flux rate is high.

The ultrafilter used in the present invention is made of an inorganic microporous membrane and thus has heat resistance. Therefore, the miscella can be treated at a considerably high temperature, whereby the flux rate will be high, and accordingly, the filter apparatus can be made compact, and the installation cost can be saved. Further, since the ultrafilter used in the present invention is an inorganic membrane, the membrane itself will not undergo a property change even when contacted with the solvent of the miscella for a long period of time, and there is no deterioration in the degree of selectivity of cut off limit.

What is claimed is:

1. A process for refining vegetable oil from a miscella obtained by extraction of vegetable seeds with an organic solvent, which comprises permeating the miscella through an ultrafilter made of an inorganic microporous membrane having a pore size of from 30 to 100 Å in a state heated at a temperature of from 50° to 120° C. to remove impurities contained in the miscella.

2. The process according to claim 1, wherein the inorganic microporous membrane is a membrane formed on an inorganic porous substrate.

3. The process according to claim 1, wherein the vegetable seeds are soybean, rapeseed, safflower, corn, sunflower or rice bran.

4. The process according to claim 1, wherein the organic solvent is an aliphatic hydrocarbon, an alicyclic hydrocarbon, an aromatic hydrocarbon, an aliphatic ketone or an aliphatic ester.

5. The process according to claim 1, wherein the organic solvent is n-hexane.

6. The process according to claim 1, wherein said temperature is from 50° to 90° C.

7. The process according to claim 1, wherein the inorganic microporous membrane is made of zirconium oxide, tin oxide, titanium oxide or cesium oxide.

8. The process according to claim 1, wherein the inorganic microporous membrane has a thickness of from 0.2 to 10 $\mu$m.

9. The process according to claim 1, wherein the miscella is permeated through the ultrafilter under a pressure of from 1 to 10 kg/cm$^2$.

10. The process according to claim 1, wherein the miscella is circulated at a liquid speed of from 0.5 to 6 m/sec against the surface of the ultrafilter.

11. The process according to claim 1, wherein the miscella contains about 25 to 35% by weight of glycerides.

12. The process according to claim 9, wherein the miscella is permeated through the ultrafilter under a pressure of from 2 to 5 kg/cm$^2$.

13. The process according to claim 10, wherein the miscella is circulated at a liquid speed of from 2 to 5 m/sec against the surface of the ultrafilter.

14. The process according to claim 1, wherein said impurities removed comprise phospholipids.

* * * * *

UNITED STATES PATENT AND TRADEMARK OFFICE
CERTIFICATE OF CORRECTION

PATENT NO. : 5,166,376
DATED : November 24, 1992
INVENTOR(S) : Shigemi Suzuki et al.

It is certified that error appears in the above-identified patent and that said Letters Patent is hereby corrected as shown below:

On the title page, Item [75],

The fourth inventor's name is incorrect, should be, --Hisashi Nogaki--

Signed and Sealed this

Thirtieth Day of March, 1993

Attest:

STEPHEN G. KUNIN

*Attesting Officer*     *Acting Commissioner of Patents and Trademarks*